(12) United States Patent
Oh et al.

(10) Patent No.: US 11,524,585 B2
(45) Date of Patent: Dec. 13, 2022

(54) METHOD OF CONTROLLING TRAVELING OF ELECTRIC VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 68 days.

(21) Appl. No.: 17/098,600

(22) Filed: Nov. 16, 2020

(65) Prior Publication Data

US 2021/0387529 A1    Dec. 16, 2021

(30) Foreign Application Priority Data

Jun. 10, 2020    (KR) .................. 10-2020-0070004

(51) Int. Cl.
*B60L 15/20*    (2006.01)

(52) U.S. Cl.
CPC ......... *B60L 15/20* (2013.01); *B60L 2240/421* (2013.01); *B60L 2240/423* (2013.01); *B60L 2240/425* (2013.01)

(58) Field of Classification Search
CPC ............... B60L 15/20; B60L 2240/421; B60L 2240/423; B60L 2240/425; B60Y 2200/91; Y02T 10/72; B60K 1/00; B60K 2001/006; F16H 61/24; G05G 5/03; H02K 11/20; H02K 11/30; H02P 23/14; H02P 27/04
See application file for complete search history.

(56) References Cited

U.S. PATENT DOCUMENTS

| | | | |
|---|---|---|---|
| 2008/0060861 A1* | 3/2008 | Baur ............... | B60K 1/00 180/65.6 |
| 2014/0195088 A1* | 7/2014 | Schuessler ........ | B60W 50/14 701/22 |
| 2021/0053487 A1* | 2/2021 | Vangelov ......... | B60W 50/0098 |
| 2021/0309113 A1* | 10/2021 | Mazzini ........... | B60L 15/20 |
| 2022/0041066 A1* | 2/2022 | Isami .............. | B60L 15/2054 |
| 2022/0041070 A1* | 2/2022 | Isami .............. | B60K 23/02 |

FOREIGN PATENT DOCUMENTS

| | | | | |
|---|---|---|---|---|
| CN | 102770300 A | * | 11/2012 | ........... B60K 17/356 |
| CN | 102255282 B | * | 1/2014 | |
| CN | 109177742 A | * | 1/2019 | ........... B60L 15/20 |

* cited by examiner

*Primary Examiner* — Michael J Zanelli

(74) *Attorney, Agent, or Firm* — Fox Rothschild LLP

(57) ABSTRACT

A method of controlling traveling of an electric vehicle is provided. The method includes generating a motor torque command using a basic torque command and a virtual gear-shift intervention torque for generating a feeling of real gear shifting, while an electric vehicle travels. A motor is operated for driving the electric vehicle according to the generated motor torque command to generate the feeling thereof. Ingenerating the feeling thereof, during at least a portion of time during which the feeling thereof is generated, boost control of the motor operation is performed such that a motor torque exceeding an allowable torque of the motor is generated, and thus the generation of the feeling thereof and the boost control are performed in conjunction with each other.

13 Claims, 9 Drawing Sheets

CALCULATION OF LIMIT TORQUE FOR EACH VIRTUAL GEAR-SHIFT STEP, REFLECTING GEAR RATIO INFORMATION

CALCULATION OF LIMIT TORQUE FOR EACH
VIRTUAL GEAR-SHIFT STEP,
REFLECTING GEAR RATIO INFORMATION

ACCELERATION THAT RESULTS WHEN PERFORMING GEAR
SHIFT IN VEHICLE EQUIPPED WITH ACTUAL TRANSMISSION

SIMULATION OF ACCELERATION WHEN PERFORMING GEAR SHIFT
IN ELECTRIC VEHICLE REALIZING VIRTUAL GEAR-SHIFT STEP

METHOD OF CONTROLLING TRAVELING OF ELECTRIC VEHICLE

CROSS REFERENCE TO RELATED APPLICATION

The present application claims priority to Korean Patent Application No. Korean Patent Application No. 10-2020-0070004, filed Jun. 10, 2020, the entire contents of which is incorporated herein for all purposes by this reference.

BACKGROUND

Field of the Disclosure

The present disclosure relates to a method of controlling traveling of an electric vehicle, and more particularly, to a boost application control strategy capable of both improving durability and increasing acceleration performance of an electric vehicle and to a method of controlling traveling of an electric vehicle using the boost application control strategy.

Description of the Related Art

As is well known, electric vehicles (EV) use one or more motors for propulsion. The drive system of an electric vehicle includes a motor serving as a source of driving force, a battery for supplying electric energy to the motor, an inverter for driving the motor, and a decelerator that reduces rotary power of the motor and transfers the reduced rotary power to drive wheels. The motor is connected to the battery via the inverter, thereby charging or discharging the battery according to the operating mode thereof.

The inverter converts direct current (DC) current into alternating current (AC) current and supplies the resulting AC current to the motor through a power cable during a driving operation of the motor. Conversely, the inverter converts AC current generated by the motor which operates as a generator into DC current and supplies the resulting DC current to the battery to charge the battery during a regeneration operation of the motor.

Unlike internal combustion engine vehicles, electric vehicles do not use a multi-gear transmission. Instead, electric vehicles use a decelerator which is disposed between the motor and the drive wheel and which uses a fixed gear ratio. The reason for this is as follows. The internal combustion engine has a wide distribution range of energy efficiency according to an operating point and provides a high torque only at a high speed. In contrast, the motor has a relatively narrow distribution range of energy efficiency according to an operating point and provides a high torque even at a low speed with only its own features.

On the other hand, acceleration performance of an electric vehicle depends on the torque capacity of the motor. The torque capacity of the motor is affected by the performance of the inverter that controls the motor, the power supply capacity of the battery, and the maximum capacities of the powertrain electronic (PE) components, or the like. Generally, the maximum capacity is limited in such a manner that it is utilized within a range where the security is guaranteed, and a value of this limitation is adjusted to maintain a thermodynamic balance in a normal state. Therefore, when a load is at or above the value of the limitation, a torque higher than the rated torque may be generated and thus acceleration may be increased. In particular, however, the associated PE components may be excessively heated, leading to a vehicle fire.

Herein, the term "normal state" indicates that the same condition or state is maintained for a sufficiently long period of time. Therefore, the maximum capacities of the respective PE components are conservatively set. In other words, the maximum capacities that are set assuming the normal state are lower than instantaneous performances. If it is assumed that the PE components are used only for a short time, i.e., the PE components are not used in the normal state, it is possible that instantaneous load tolerances thereof are increased to be higher than the capacities set for the normal state. An instantaneous increase to that end in the output of each PE component, such as the motor, is referred to as "boosting".

However, if the boosting is maximally performed while the electric vehicle travels, this requires that boosting operations and normal operations are alternately performed. However, this causes a difference from driver's expectation in terms of a feeling of acceleration of the electric vehicle or drivability. Specifically, when boosting and normal operation are frequently alternate, the drivability is deteriorated. For this reason, a boost application strategy to use a boosting function without deteriorating drivability is required.

SUMMARY

The present disclosure provides a boost application control strategy capable of both improving drivability of an electric vehicle and increasing acceleration performance thereof. Another objective of the present disclosure is to provide a method of controlling traveling of an electric vehicle by using the boost application control strategy.

According to an aspect of the present disclosure, a method of controlling traveling of an electric vehicle may include: enabling a controller to generate a motor torque command using a basic torque command and a virtual gear-shift intervention torque for generating a feeling of real gear shifting, while an electric vehicle is being driven; and enabling the controller to operate a motor for driving the electric vehicle, according to the generated motor torque command and thus to generate the feeling of real gear shifting, in which in the generating of the feeling of real gear shifting, during at least a portion of time during which the feeling of real gear shifting is generated, boost control for operating the motor is performed in such a manner that a motor torque exceeding an allowable torque of the motor is generated, and thus the generation of the feeling of real gear shifting and the boost control may be performed in conjunction with each other.

With the method of controlling traveling of an electric vehicle according to the present disclosure, torque boost maybe performed in conjunction with realization of a feeling of virtual multi-gear shift in the electric vehicle equipped with a decelerator. Thus, a condition for durability of the motor maybe satisfied, and additionally, a torque higher than a normal torque of the motor may possibly be generated, thereby increasing acceleration. In addition, at a point in time at which a process of realizing the feeling of virtual multi-gear shift is possibly expected to be performed, an instantaneous boost operation maybe performed. Thus, a driver's feeling of a difference during driving can maybe reduced. Furthermore, drivability maybe improved, and at the same time, acceleration performance maybe increased.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
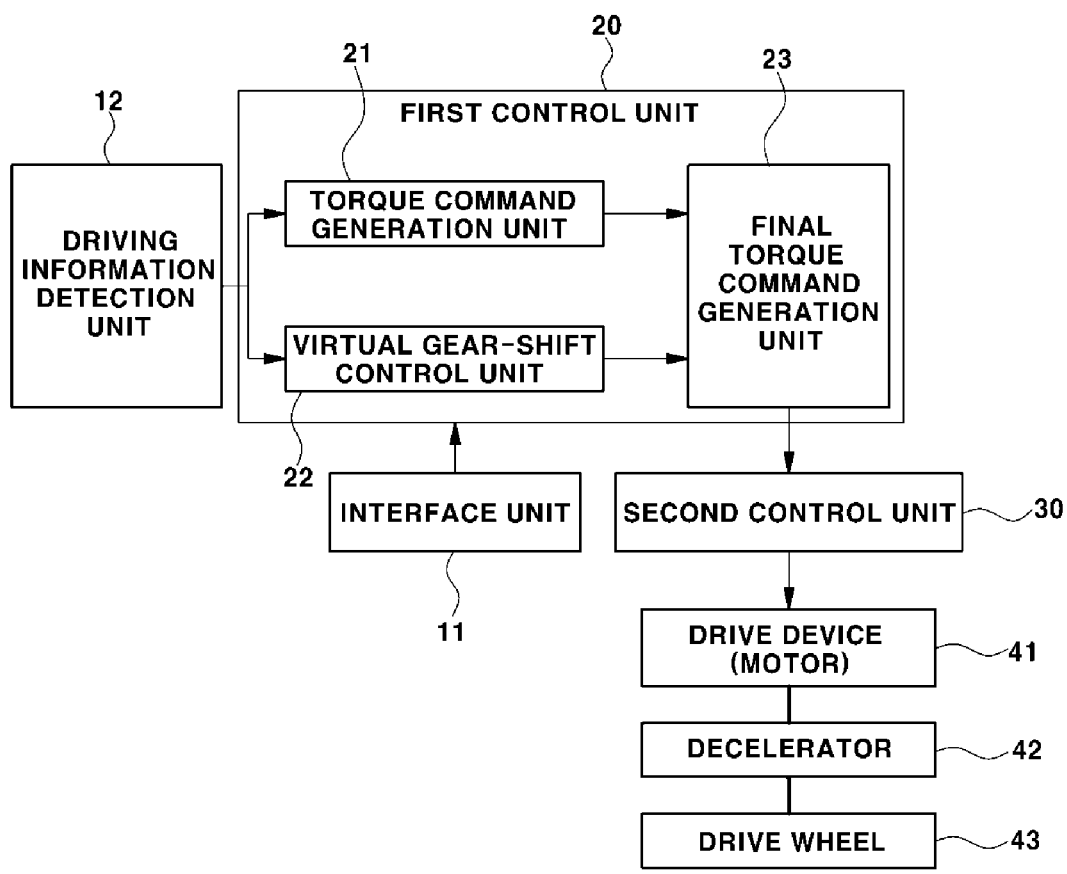
FIG. 1 is a block diagram illustrating a configuration of a device for controlling an electric vehicle according to the present disclosure.

It is understood that the term "vehicle" or "vehicular" or other similar term as used herein is inclusive of motor vehicles in general such as passenger automobiles including sports utility vehicles (SUV), buses, bucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Embodiments of the present disclosure will be described in detail below with reference to the accompanying drawings in such a manner that a person of ordinary skill in the art to which the present disclosure pertains is enabled to practice without undue experimentation. However, the present disclosure is not limited to the exemplary embodiments that will be described below, and an improvement thereon and a modification thereto may be implemented.

When the expression "includes a constituent element" is used throughout the specification, unless otherwise particularly described, this expression means "further includes any other constituent element, not "excludes any other constituent element". The present disclosure provides a boost application control method capable of both improving drivability of the electric vehicle and increasing acceleration performance thereof, and a method of controlling traveling of an electric vehicle, the method using the boost application control method. Accordingly, a method is provided in which functions of realizing a feeling of real gear shifting in the electric vehicle and performing a motor boost mode are performed in conjunction with each other and in which an instantaneous boost torque is thus effectively used in such a manner that a driver does not feel a difference.

Normally, maximum allowable charging and discharging torques of a motor for driving the electric vehicle, that is, a drive motor, are determined using a normal state as a reference. Therefore, when the motor operates for a short time, a torque higher than the maximum allowable charging and discharging torques, which is determined using the normal state as a reference, is generated for the short time. In other words, the motor torque is increased to a torque higher than the allowable torques, instantaneously, that is, for a predetermined short time or shorter. This increase is referred to as "boost" of the motor.

When the motor boost in conjunction with the rhythmic feeling of real gear shifting is realized in this manner in the electric vehicle using a technology in which the motor torque is instantaneously increased to a torque greater than the allowable torque, a requirement for durability of the motor is satisfied, and a torque greater than a normal torque of the motor is generated, thereby increasing acceleration of the vehicle. In addition, control may be performed in such a manner that an instantaneous boost operation is performed at a point in time at which such an operation is possibly expected to be performed. Therefore, a driver's feeling for a driving difference is reduced.

This natural motor boost is performed in the electric vehicle in conjunction with a function of producing the feeling of real gear shifting, based on a rhythmic feeling of accelerating and decelerating the vehicle, resulting from sensibility obtained by a virtual multi-gear transmission. The concept of the number of gear-shift steps does not apply to the electric vehicle that does not have the function of producing the feeling of real gear shifting. Therefore, the durability is provided in a continuous and seamless manner.

However, a discontinuous point in accelerating and decelerating the vehicle in terms of the durability occurs in a process of realizing the feeling of real gear shifting, when the feeling of real gear shifting is produced while the electric vehicle travels, that is, when the feeling of real gear shifting is realized in a virtual gear shift situation, such as a situation where a gear-shift step is changed in a vehicle equipped with a multi-gear transmission.

The effective use of the discontinuous point in accelerating and decelerating the vehicle in terms of the durability may associate respective points in time at which the boost is applied and not applied, with the discontinuous point. With this association, the boost may be performed effectively and naturally. Furthermore, satisfactory driving capability of the vehicle maybe secured. A virtual gear-shift function of the electric vehicle will be described below to help with an understanding of the present disclosure.

In the following description, the motor refers to a drive motor that drives a vehicle. According to the present disclosure, a vehicle that is a control target is an electric vehicle equipped with a decelerator instead of an internal combustion engine (general engine) and a multi-gear transmission. As described above, unlike existing vehicles equipped with an internal combustion engine, typical electric vehicles (motor-driven vehicles), driven by a motor, do not use the multi-gear transmission. Instead, in the typical electric vehicles, the decelerator using a fixed gear is disposed between a motor and a drive wheel.

The absence of the multi-gear transmission provides advantages in that no discontinuity occurs in terms of the drivability when performing gear shifting and in that smoothness is thus secured in terms of the drivability. However, a driver who likes to feel tactility, fun, excitement, responsiveness, and the like, which can be provided by the multi-gear transmission, may feel bored during driving. Therefore, technologies are required that make it possible for the driver to feel tactility, fun, excitement, responsiveness, and the like, which can be provided by the multi-gear transmission, in the electric vehicle equipped with the decelerator instead of the multi-gear transmission.

The function of realizing the feeling of real gear shifting makes it possible for the driver to feel a desired feeling in the same vehicle without the need to drive another vehicle when he/she likes to feel tactility, fun, excitement, responsiveness, and the like, which maybe provided by only the multi-gear transmission. Thus, an improvement in marketability of the electric vehicle and differentiated marketing thereof are made possible.

In existing electric vehicles, it is impossible for the driver to control a gear-shift step, and only with a speed and an acceleration pedal input, it is possible for the driver to control behavior of the electric vehicle. Furthermore, if the virtual gear-shift function is realized in a high-performance vehicle capable of traveling for sports, speed adjustment for circling an object, load movement management, and the like is facilitated during driving. Therefore, virtual gear-shift control that controls the drive motor in such a manner as to produce and realize the feeling of virtual multi-gear shift is performed using the virtual gear-shift model established within a controller in the electric vehicle not equipped with the multi-gear transmission.

In other words, under the virtual gear-shift control, a virtual gear-shift intervention torque and a limit torque for each virtual gear-shift step are determined from an input variable through the virtual gear-shift model of which an input is to be vehicle driving information collected in a vehicle while the vehicle travels. The motor is operated using the determined virtual gear-shift intervention torque and limit torque for each virtual gear-shift step and a motor torque command. Thus, the feeling of virtual multi-gear shift is realized.

The virtual gear-shift function is to generate the feeling of real gear shifting in such a manner that the feeling of multi-gear shift, which the driver may feel when performing gear shifting in the vehicle equipped with the multi-gear transmission, is simulated while the electric vehicle not equipped with the multi-gear transmission travels. Accordingly, the feeling of real gear shifting is generated according to a driver's driving input value and a vehicle state based on a preset variable (parameter) associated with the generation of the feeling of real gear shifting. The feeling of real gear shifting here is a feeling resulting from simulating a behavior and motion of the vehicle, which the drive feels in a process of performing gear shifting in the multi-gear transmission and, under the virtual gear-shift control, is generated and realized by operating the drive motor. The multi-gear transmission here is one among an automatic transmission (AT), a dual clutch transmission (DCT), and an automated manual transmission (AMT).

According to the present disclosure, the behavior and motion of the vehicle that appear during a process of performing gear shifting in the vehicle equipped with one of these transmissions are generated and simulated by operating the drive motor. Thus, the feeling of real gear shifting is provided, and boost control is performed while performing control for the feeling of real gear shifting.

FIG. 1 is a block diagram illustrating a configuration of a device for control traveling of an electric vehicle according to the present disclosure and illustrates a configuration of a device that performs the control for the feeling of real gear shifting and the boost control. Control methods according to the present disclosure may include a virtual gear-shift method of generating and realizing the feeling of real gear shifting resulting from simulating the feeling of multi-gear shift in the existing vehicle equipped with the multi-gear transmission, through motor control while the vehicle travels.

A configuration of a device for performing a virtual gear-shift process is first described. As illustrated in FIG. 1, a device for control according to the present disclosure may include a driving information detection unit 12 configured to detect vehicle driving information, a first controller 20 configured to generate and output a torque command based on the vehicle driving information detected by the driving information detection unit 12, and a second controller 30 configured to operate a drive device 41 according to the torque command, output by the first controller 20.

Additionally, the device for control according to the present disclosure may further include an interface unit 11, for the driver to select and input one of turning-on and-off of the virtual gear-shift function of the vehicle. In the following description, control entities are divided into the first controller 20 and the second controller 30. However, a plurality of controllers or one integrated control component is collectively referred to as a controller. Thus, it may also be understood that a control process according to the present disclosure is performed this controller.

Any device by which the drive may turn on and off the virtual gear-shift function in the electric vehicle may be used as the interface unit 11. Examples of the interface unit 11 include operating devices, such as a button and a switch, that are provided in the electric vehicle, and an input device, a touch screen, and the like in an audio, video, and navigation (ANV) system. The interface unit 11 is connected to the first controller 20. When the driver turns on or off the virtual gear-shift function, a signal for turning on or off the virtual gear-shift function may be accordingly input into the first controller 20 though the interface unit 11. Thus, the first controller 20 may be configured to detect whether the driver turns on or off the virtual gear-shift function.

According to the present disclosure, the virtual gear-shift function that generates and realizes the feeling of real gear shifting while the electric vehicle travels may be performed only in a case where the driver turns on the virtual gear-shift function through the interface unit 11. In addition, although not illustrated in FIG. 1, the driver may also turn on or off the virtual gear-shift function through a mobile device (not illustrated), instead of the interface unit 11 that is an input device for a vehicle, provided in the electric vehicle.

The mobile device may be communicatively connected to a device within the vehicle, for example, the first controller. Accordingly, an input and output communication interface (not illustrated) may be used for establishing a communication connection between the mobile device and the first controller 20. The driving information detection unit 12 may be configured to detect vehicle driving information necessary to generate the motor torque command in the electric vehicle. The vehicle driving information here may include driver's driving input information and vehicle state information.

According to an exemplary embodiment of the present disclosure, the driving information detection unit 12 may include an acceleration pedal detection unit configured to detect acceleration pedal input information according to operating of an acceleration pedal by the driver, and a brake pedal detection unit configured to detect brake pedal input information according to operating of a brake pedal by the driver. Additionally, the driving information detection unit 12 may further include a paddle shift and shift lever detection unit, and a motor speed detection unit configured to detect a rotation speed of the motor (hereinafter referred to as a "motor speed"), which is the drive device 41 driving the electric vehicle.

The acceleration pedal detection unit here may be a normal accelerator position sensor (APS) installed on an acceleration pedal and configured to output an electric signal according to a state where the drive operates the acceleration pedal. The brake pedal detection unit may be a normal brake pedal sensor (BPS) installed on a brake pedal and configured to output an electric signal according to a state where the driver operates the brake pedal. In addition, the motor speed detection unit is a well-known resolver installed in the drive device (drive motor) 41.

In particular, the driver's driving input information may include an acceleration pedal input value (APS value) detected by the acceleration pedal detection unit, and a brake pedal input value (BPS value) detected by the brake pedal detection unit. Additionally, the driver's driving input information may further include paddle shift input information according to operation of a paddle shift by the driver, and shift lever input information (P-, R-, N-, or D-indicated step information) according to operation of a shift lever by the driver.

The shift lever input information may be detected by a shift lever detection unit, and the paddle shift input information may be input from the paddle shift into the first controller 20. In addition, the vehicle state information may include a motor speed detected by the motor speed detection unit. The vehicle driving information, used by the torque command generation unit 21 to generate a basic torque command, may further include a vehicle speed as the vehicle state information. In particular, although not illustrated in FIG. 1, the driving information detection unit 12 may further include a vehicle speed detection unit configured to detect a current traveling vehicle speed. The vehicle speed detection unit may include a wheel speed sensor installed on a drive wheel of the electric vehicle.

The first controller 20 may include the torque command generation unit 21 configured to generate the basic torque command from the vehicle driving information, a virtual gear-shift controller 22 configured to generate a compensation torque command (e.g., a virtual gear-shift intervention torque command for realizing the feeling of real gear shifting) for generating and realizing the feeling of real gear shifting from the vehicle driving information, and a final torque command generation unit 23 configured to generate a final torque command that results from changing the basic torque command using the compensation torque command.

The basic torque command is a motor torque command, determined and generated based on the driving information collected while a normal electric vehicle travels. The torque command generation unit 21 is a vehicle control unit (VCU) or a component thereof in the normal electric vehicle, configured to generate the motor torque command based on the driving information. In addition, according to the present disclosure, the virtual gear-shift controller 22 may be configured to determine, generate, and output the virtual gear-shift intervention torque command that is a compensation torque command for realizing only the feeling of real gear shifting, separately from the basic torque command. The virtual gear-shift controller 22 may be added as a component of the vehicle unit thereto or is provided as a control component separate from the vehicle controller.

In the final torque command generation unit 23, the basic torque command, input from the torque command generation unit 21, may be changed using the compensation torque command, input from the virtual gear-shift controller 22. In other words, the virtual gear-shift intervention torque command that is the compensation torque command is added to the basic torque command, thereby obtaining a final torque command. The second controller 30 may be configured to receive the torque command transmitted by the first controller 20, that is, the final torque command determined by the final torque command generation unit 23 of the first controller 20, and thus operate the drive device 41. According to the present disclosure, the drive device 41 is the motor (drive motor) that drives the electric vehicle, and the second controller 30 is a well-known motor control unit (MCU) in a normal electric vehicle, which drives the motor through an inverter and controls operation of the motor. On the other hand, according to the present disclosure, the virtual gear-shift model of which the input is set to be the vehicle driving information collected in the electric vehicle and which determines and outputs the virtual gear-shift intervention torque command is set and is input into the virtual gear-shift controller 22.

According to the present disclosure, an input variable of the virtual gear-shift model is the vehicle driving information detected by the driving information detection unit 12, and the vehicle driving information, as described above, includes the driver's driving input information and the vehicle state information. The driver's driving input information here includes the acceleration pedal input information (APS value information), the brake pedal input information (BPS value information), the paddle shift input information, and the shift lever input information (P-, R-, N-, and D-indicated step information). The vehicle state information includes the motor speed.

In the virtual gear-shift controller 22, values of intermediate variables may be calculated from a model input variable using the virtual gear-shift model. Furthermore, a torque command only for generating and realizing the feeling of real gear shifting, and the limit torque for each virtual gear-shift step, in which gear ratio information is reflected, may be determined from the values of the intermediate variables and output. The torque command here only for generating and realizing the feeling of real gear shifting is not only the virtual gear-shift intervention torque command, but also the compensation torque command for changing the basic torque command.

Figure 2:
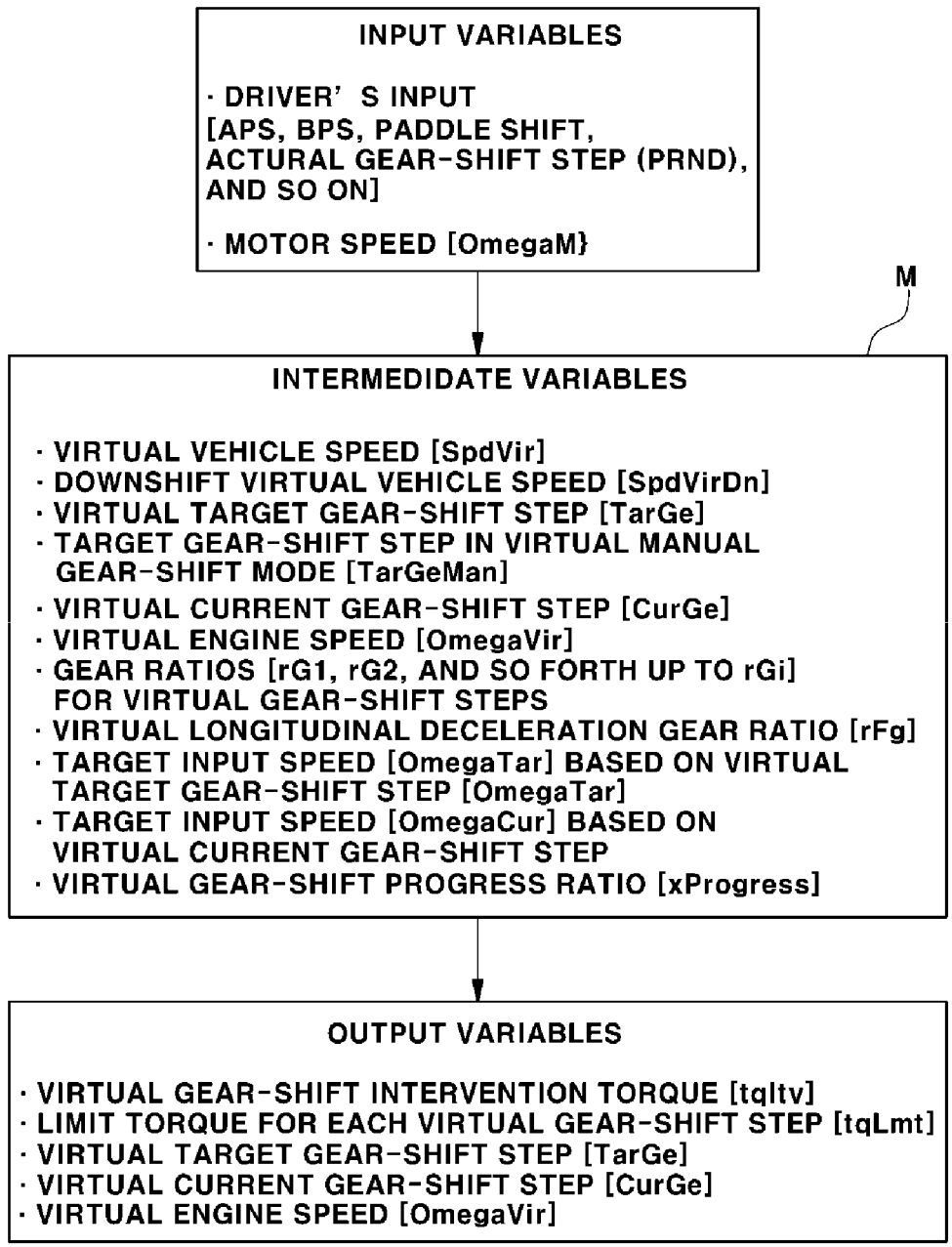
FIG. 2 is a block diagram illustrating input and output variables of a virtual gear-shift model and intermediate variables for virtual gear shift for realizing a virtual gear-shift function according to the present disclosure.

FIG. 2 shows that as the vehicle driving information, the acceleration pedal input information (APS value information), the brake pedal input information (BPS value information), the paddle shift input information, the shift lever input information (P-, R-, N-, and D-indicated step information), and motor speed (OmegaM) information are input variables of a virtual gear-shift model (M). In addition, FIG. 2 illustrates intermediate variables, used in the virtual gear-shift model (M) to perform the virtual gear-shift function, that is, model intermediate-variables for generating the feeling of real gear shifting, obtained from the input variable in the virtual gear-shift model.

According to an exemplary embodiment of the present disclosure, the model intermediate-variables obtained from the input variable include a virtual vehicle speed (SpdVir), a downshift virtual vehicle speed (SpdVirDn), a virtual target gear-shift step (TarGe), a target gear-shift step (TarGe-Man) in a virtual manual gear-shift mode, a virtual current gear-shift step (CurGe), a virtual engine speed (OmegaVir), gear ratios (rG1, rG2, and so forth up to rGi) for virtual gear-shift steps, a virtual longitudinal deceleration gear ratio (rFg), a target input speed (OmegaTar) based on a virtual target gear-shift step, a target input speed (OmegaCur) based on a virtual current gear-shift step, and a virtual gear-shift progress ratio (xProgress).

The "input speed" here refers to a virtual engine speed that becomes an input speed of a virtual transmission when it is assumed that a virtual transmission and a virtual engine are present in an electric vehicle. Accordingly, the "target input speed based on a virtual target gear-shift step" refers to a virtual engine speed for a virtual target gear-shift step, and the "target input speed based on a virtual current gear-shift step" refers to a virtual engine speed for a virtual current gear-shift step. According to the present disclosure, an intermediate variable for the virtual gear shift has no relationship with a physical value of an actual hardware piece of an electric vehicle and is used only for realizing the feeling of real gear shifting.

According to the present disclosure, physical variables that are actually physically involved in a drive system of the electric vehicle or are used as actual measurement values include the input variables (the APS value, the BPS value, the paddle shift input value, and the shift lever input value), the motor speed (OmegaM), the virtual gear-shift intervention torque (tqltv), and the limit torque for each virtual gear-shift step (tqLmt). In addition, according to an exemplary embodiment of the present disclosure, output variables of the virtual gear shift model (M) include the virtual gear-shift intervention torque command (the compensation torque command) (Tqltv) for providing and realizing the feeling of real gear shifting.

Additionally, the output variables of the virtual gear shift model (M) may further include the limit torque (tqLmt) for each virtual gear-shift step. In addition, according to an exemplary embodiment of the present disclosure, the output variables of the virtual gear shift model (M) may further include at least one or several of the intermediate variables for the virtual gear shift. For example, the output variables thereof may further include the virtual target gear-shift step (TarGe), the virtual current gear-shift step (CurGe), and the virtual engine speed (OmegaVir), among the intermediate variables for the virtual gear shift.

The virtual target gear-shift step (TarGe), the virtual current gear-shift step (CurGe), and the virtual engine speed (OmegaVir) that are output from the virtual gear-shift model (M) are transferred to a cluster controller (not illustrated) and become pieces of cluster display information that are displayed on a cluster (not illustrated). The virtual gear-shift intervention torque command and the limit torque for each virtual gear-shift step (e.g., a limit torque for a current gear-shift step) that are output from the virtual gear-shift controller 22 are input into the final torque command generation unit 23, and are subsequently used in the final torque command generation unit 23 to generate a final torque command from the basic torque command.

In other words, in the final torque command generation unit 23, if necessary, the basic torque command is limited to the limit torque for each virtual gear-shift step. When the basic torque command is below a limit torque value, the basic torque command is used as is. However, when the basic torque command is equal to or greater than the limit torque value, the basic torque command may be limited to a limit torque value. In this manner, the basic torque command that is limited, in the final torque command generation unit 23, to within the limit torque for each virtual gear-shift step is subsequently summed with the virtual gear-shift intervention torque command, and the resulting torque command becomes a final motor torque command.

When the basic torque command is equal to or greater than the limit torque value, the final motor torque command may be determined as the sum of the limit torque value and the virtual gear-shift intervention torque command. In this manner, the final motor torque command, calculated in the final torque command generation unit 23, may be transferred to the second controller 30, and the second controller 30 may be configured to operate the motor according to the final motor torque command.

The intermediate variables for the virtual gear shift in the virtual gear-shift model (M) within the virtual gear-shift controller 22 will be described in more detail below. First, the virtual vehicle speed (SpdVir) may be generated as an input to a gear-shift schedule map in the virtual gear-shift model (M) within the virtual gear-shift controller 22. The virtual vehicle speed (SpdVir) may be used as a reference vehicle speed in the virtual gear-shift function. The virtual vehicle speed (SpdVir) may be calculated as a value that is directly proportional to the actual motor speed (OmegaM), using the actual motor speed (OmegaM), which is one among the model input variables, and the virtual longitudinal deceleration gear ratio (rFg).

In an example in FIG. 2, it is illustrated that the virtual longitudinal deceleration gear ratio is included in the intermediate variables for the virtual gear shift. However, according to an exemplary embodiment of the present disclosure, the virtual longitudinal deceleration gear ratio is a preset value. In addition, in the virtual gear-shift model, the downshift virtual vehicle speed (SpdVirDn) is generated. The downshift virtual vehicle speed (SpdVirDn) is a variable that, when downshifting, is used as an input to the gear-shift schedule map. The downshift virtual vehicle speed (SpdVirDn) may be calculated by applying a preset scale factor and an offset value to the virtual vehicle speed (SpdVir).

However, when upshift and downshift gear-shift schedule maps are separately provided for use, only the virtual vehicle speed (SpdVir) that is a reference speed may be safely used. When one gear-shift schedule map is provided for use without any distinction between the upshift and downshift gear-shift schedule maps, the downshift virtual vehicle speed (SpdVirDn) is further used in addition to the virtual vehicle speed (SpdVir) that is the reference vehicle speed, to add a hysteresis effect between the upshift and the downshift. According to the present disclosure, to achieve a normal hysteresis effect, the downshift virtual vehicle speed (SpdVirDn) may be determined as a value resulting from adding the positive offset value to a value obtained by multiplying the virtual vehicle speed (SpdVir) by a scale factor that is greater than 1.

Figure 3:
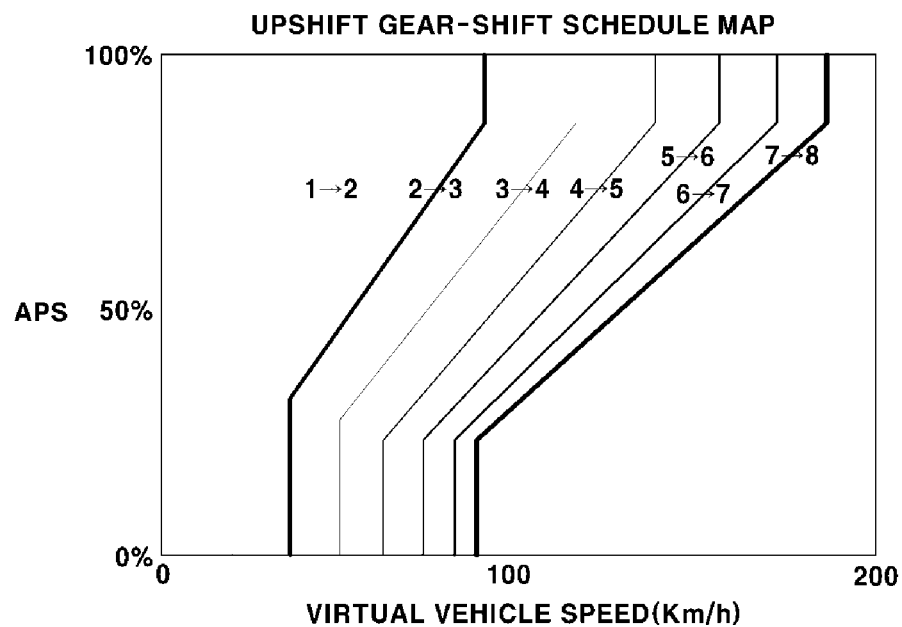
FIG. 3 is graphs illustrating a gear-shift schedule map for determining a virtual target gear-shift step according to the present disclosure.
Figure 3:
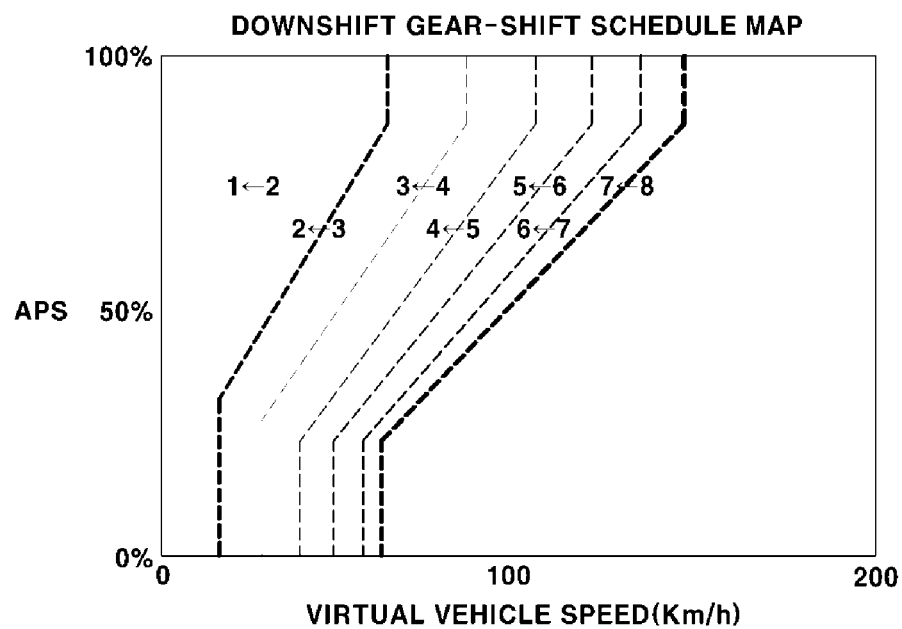

FIG. 3 is graphs illustrating the gear-shift schedule map for determining the virtual target gear-shift step (TarGe) according to the present disclosure. FIG. 3 illustrates the upshift gear-shift schedule map and the downshift gear-shift schedule map that are separately provided. In each of the illustrated gear-shift schedule maps, the horizontal axis represents a vehicle speed (km/h), and the vertical axis represents an acceleration pedal input value (APS value). In particular, the vehicle speed on the horizontal axis is the virtual vehicle speed (SpdVir) that is the reference vehicle speed. In this manner, the input of the gear-shift schedule map may beset to be the acceleration pedal input value (APS value) indicating the virtual vehicle speed (SpdVir) and the intention of the driver. The virtual vehicle speed (SpdVir) and the virtual target gear-shift step (TarGe) corresponding to the acceleration pedal input value (APS value) may be determined from the gear-shift schedule map.

As illustrated in FIG. 3, in a case where the upshift gear-shift schedule map and the downshift gear-shift schedule map are provided separately from each other, one virtual vehicle speed may be used as a vehicle speed for determining the virtual target gear-shift step (TarGe). At this time, as described above, the virtual vehicle speed is the virtual vehicle speed (SpdVir) that is a reference vehicle speed, which is obtained from the actual motor speed (OmegaM) and the virtual longitudinal deceleration gear ratio (rFG).

In this manner, when the upshift and downshift gear-shift schedule maps are used separately from each other, the virtual target gear-shift step (TarGe) may be determined from the virtual vehicle speed (SpdVir) that is the reference vehicle speed and from the acceleration pedal input value (APS value). However, when one gear-shift schedule map is used for the upshift and downshift, the virtual target gear-shift step (TarGe) may be determined using the downshift virtual vehicle speed (SpdVir) separately from the virtual vehicle speed (SpdVir) that is the reference vehicle speed.

Figure 4:
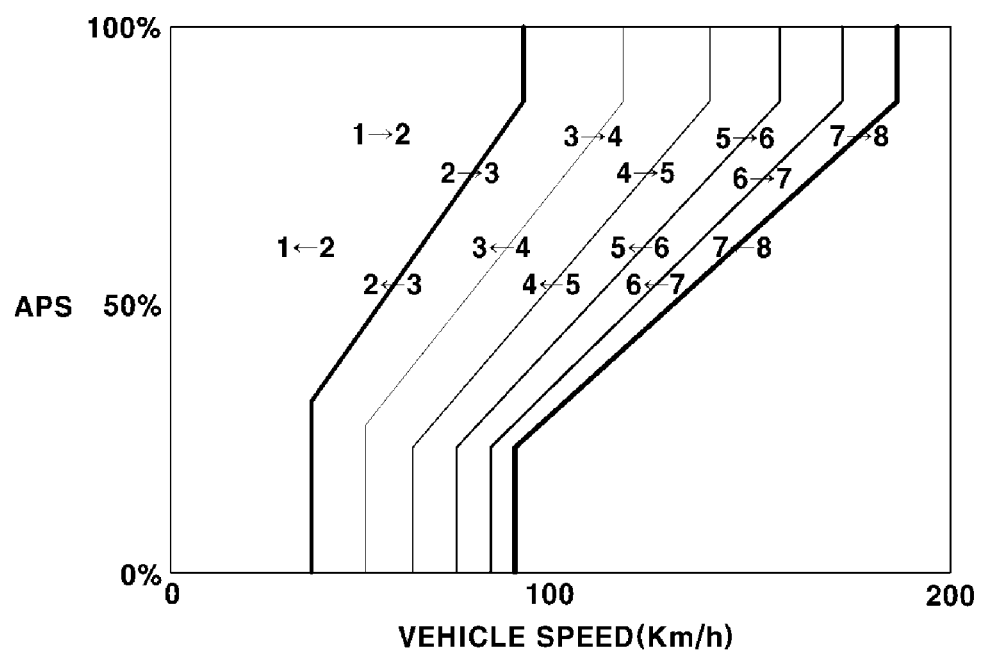
FIG. 4 is a graph illustrating one gear-shift schedule map that is usable for both upshift and downshift according to the present disclosure.

FIG. 4 is a graph illustrating one gear-shift schedule map that is usable for both the upshift and downshift according to the present disclosure. One gear-shift schedule map illustrated in FIG. 4 may be used both when upshifting and when downshifting. In particular, when uplifting, the virtual vehicle speed (SpdVir) (which becomes an upshift virtual vehicle speed) that is the reference vehicle speed is used as an input variable for determining the virtual target gear-shift step (TarGe) in the gear-shift schedule map. Furthermore, when downshifting, the downshift virtual vehicle speed (SpdVirDn) is used as an input variable for determining the virtual target gear-shift step (TarGe) in the gear-shift schedule map.

In other words, when one gear-shift schedule map is used, when upshifting, the virtual target gear-shift step (TarGe) may be determined from the virtual vehicle speed (SpdVir) that is the reference vehicle speed and from the acceleration pedal input value (APS value). Furthermore, when downshifting, the virtual target gear-shift step (TarGe) may be determined from the downshift virtual vehicle speed (SPdVirDn) and the acceleration pedal input value (APS value). In other words, in the gear-shift schedule map in FIG. 4, when upshifting, the vehicle speed on the horizontal axis is the virtual vehicle speed (SpeVir) that is the reference speed. Furthermore, when downshifting, the vehicle speed on the vertical axis is the downshift virtual vehicle speed (SpdVirDn).

The vertical axis in FIGS. 3 and 4 is described above as representing the acceleration pedal input value, that is, the APS value (%). However, instead of the acceleration pedal input value, a load value for another vehicle may be a value on the vertical axis in the gear-shift schedule map. In other words, the vertical axis in the gear-shift schedule map may represent the brake pedal input value (BPS value) or the basic torque command, instead of the acceleration pedal input value. The vertical axis in the gear-shift schedule map may represent an input variable of the gear-shift schedule map for determining the virtual target gear-shift step along with the vehicle speed.

When the virtual vehicle speed (SpdVir) that is the reference vehicle speed is the upshift virtual vehicle speed, as in the following Equation 1, the downshift virtual vehicle speed (SpdVirDn) is determined as a value that results from adding the offset value ($\beta$) to a value obtained by multiplying the upshift virtual vehicle speed (SpdVir) by the scale factor ($\alpha$).

$$SpdVir = SpdVirDn \times \alpha + \beta \qquad \text{Equation 1}$$

Next, in the virtual gear-shift model (M) within the virtual gear-shift controller 22, it is determined whether a manual gear-shift mode is entered. When operation of the shift lever or input through the paddle shift occurs, the controller may be configured to determine that a state of the manual gear-shift mode in which a gear is shifted according to the driver's intention is entered, instead of a state of a general automatic gear shift in which a gear is automatically shifted according to a preset gear-shift schedule.

The target gear-shift step according to the driver's intention may differ from the target gear-shift step that is given when performing automatic gear shifting. Therefore, in response to determining that the state of the manual gear-shift mode is entered, the target gear-shift step in the manual gear-shift mode, that is, the target gear-shift step (TarGe-Man) in the virtual manual gear-shift mode, may be determined in the virtual gear-shift model (M) within the virtual gear-shift controller 22. The target gear-shift step (TarGe-Man) in the virtual manual gear-shift mode may be determined by the driver's shift lever input information or paddle shift input information.

In addition, the final target gear-shift step in the virtual gear-shift function may be calculated in the virtual gear-shift model (M) within the virtual gear-shift controller 22. As described above, fundamentally, in an automatic gear-shift mode, the target gear-shift step determined by the gear-shift schedule map may be determined as the virtual target gear-shift step (TarGe). However, in the manual gear-shift mode, the target gear-shift step (TarGeMan) in the virtual manual gear-shift mode, determined by the driver's shift level input or paddle shift input, may be determined as the virtual target gear-shift step (TarGe).

A method of determining the target gear-shift step by the gear-shift schedule map in the automatic gear-shift mode (instead of the manual gear-shift mode), as described above, is to use the gear-shift schedule map of which inputs are set to be load values, such as the virtual vehicle speed (km/h) and the acceleration pedal input value (APS value) (%). The gear-shift schedule map here is a map of which inputs are set to be pieces of vehicle load value information, such as the virtual vehicle speed and the acceleration pedal input value, and in which the virtual target gear-shift step corresponding to each combination of the pieces of vehicle load value information is preset. In addition to the acceleration pedal input value (APS value), which is the driver's driving input information, the brake pedal input value (BPS value), the basic torque command, or the like is used as the vehicle load value information.

As described above, the virtual vehicle speed (SpdVir), determined by the virtual longitudinal deceleration gear ratio (rFg) and the actual motor speed (OmegaM), is used as, or the downshift virtual vehicle speed (SpdVirDn), determined from the virtual vehicle speed, is used as the reference speed that is used as an input to the gear-shift schedule map. When, as described above, the target gear-shift step is determined, two target gear-shift steps, that is, two target gear-shift steps that are determined by the virtual vehicle speed (SpdVir) that is the reference speed, and by the downshift virtual vehicle speed (SpdVirDn), respectively, are present at a current point in time.

Particularly, the final target gear-shift step may be determined using two values. In this determination method, only when a value of the target gear-shift step determined by the virtual vehicle speed (SpdVir) is increased to be greater than that at a previous step (for example, a change from the first step to the second step), such a value is determined as an effective value. Thus, the target gear-shift step determined by the virtual vehicle speed (SpdVir) may be determined and substituted as the final virtual target gear-shift step (TarGe).

Likewise, only when a value of the target gear-shift step, determined by the downshift virtual vehicle speed (SpdVirDn), is decreased to be less than than that at a previous step (for example, a change from the second step to the first step), such a value may be determined as an effective value. Thus, the target gear-shift step, determined by the downshift virtual vehicle speed (SpdVirDn), may be determined and substituted as the final virtual target gear-shift step (TarGe). The requirement for this is that the virtual target gear-shift step (TarGe) should be calculated as a value that falls within a range from the selectable lowest step to the selectable highest step.

On the other hand, in the virtual gear-shift model (M) within the virtual gear-shift controller 22, a delay target gear-shift step that has a value resulting from delaying by a fixed delay time may be determined from the virtual target gear-shift step (TarGe). The fixed delay time here is a preset time and refers to time during which a gear step for the virtual engine speed (OmegaVir), which is scheduled to be changed to the target gear-shift step, has not yet started. The fixed delay time is time that refers to a state that is attained before an inertia phase starts in an actual transmission. In the virtual gear-shift model (M) within the virtual gear-shift controller 22, a change in the target gear-shift step (TarGe) may be detected to calculate the virtual gear-shift progress ratio (xProgress).

The change here in the target gear-shift step refers to that a new virtual target gear-shift step different from a current gear-shift step is determined from the paddle shift input information or the shift lever input information in the gear-shift schedule map or in the manual gear-shift mode. The controller may be configured to start to count from a point in time at which the target gear-shift step is changed (e.g., a point in time at which the new virtual target gear-shift step is determined) to time 0. The gear-shift progress ratio (xProgress) may be determined as a percentage of the counted time with respect to a preset total gear-shift step time. The gear-shift progress increases to 100%.

The point in time at which the target gear-shift step is changed refers to a point in time at which a new virtual target gear-shift step is determined, by the gear-shift schedule map, from a virtual current gear-shift step that is a previous target gear-shift step. In this manner, the counter starts to count, with a point in time at which to change the target gear-shift step being set to time 0. However, it is also possible that a point in time at which to start to count is replaced with a point in time at which a change in the delay target gear-shift step takes place.

In other words, when the changed virtual target gear-shift step is determined, the controller may be configured to count the time from a point in time at which the delay time elapsed after the virtual target gear-shift step was determined. Then, the controller may be configured to determine the virtual gear-shift progress ratio with the same method using the counted time. Alternatively, as another method, in terms of expression, it may also be possible to use a percentage indicating at which position between the target input speed (OmegaCur) based on the virtual current gear-shift step (e.g., the virtual engine speed for the virtual current gear-shift step) and the target input speed (OmegaTar) based on the virtual target gear-shift step (e.g., the virtual engine speed for the virtual target gear-shift step) a value of a current virtual engine speed (OmegaVir), obtained in real time, is positioned during the process of performing gear shifting.

In other words, at a point in time at which the virtual target gear-shift step is determined, the virtual gear-shift progress ratio may be determined as a percentage of a speed difference between the real-time virtual engine speed (OmegaVir), which occurs during the process of performing gear shifting, and the target input speed (OmegaCur) based on the virtual current gear-shift step with respect to a speed difference between the target input speed (OmegaTar) based on the virtual target gear-shift step and the target input speed (OmegaCur) based on the virtual current gear-shift step, which occurs during the process of performing gear shifting.

In the virtual gear-shift model (M) within the virtual gear-shift controller 22, fundamentally, the virtual engine speed (OmegaCur) may be determined using the virtual vehicle speed (SpdVir), which is the reference vehicle speed, and the virtual gear ratio (rGi) for the virtual current gear-shift step. In other words, the virtual engine speed (OmegaCur) may be obtained from a value that results from multiplying the virtual vehicle speed (SpdVir) and the virtual gear ratio (rGi) for the virtual current gear-shift step together. Alternatively, the virtual engine speed (OmegaCur) may be obtained from a value that results from multiplying a drive-system speed, such as a motor speed, and the virtual gear ratio (rGi) for the virtual current gear-shift step together.

In addition, during the process of performing gear shifting, which starts from a point in time at which the target gear-shift step is changed, that is, a point in time at which gear shifting starts, the virtual engine speed (OmegaVir) may be determined based on the target input speed (OmegaCur) based on the virtual current gear-shift step (=the virtual engine speed for the virtual current gear-shift step) and the target input speed (OmegaTar) based on the virtual target gear-shift step (=the virtual engine speed for the virtual target gear-shift step). At this point, the target input speed (OmegaCur) based on the virtual current gear-shift step may be obtained using the virtual vehicle speed (SpdVir) at the point in time at which the target gear-shift step is changed and the virtual gear ratio (rGi) for the virtual current gear-shift step (CurGe).

The target input speed (OmegaTar) based on the virtual target gear-shift step may be obtained using the virtual vehicle speed (SpdVir) at the point in time at which the target gear-shift step is changed and the virtual gear ratio (rGi) for the virtual target gear-shift step (TarGe). Subsequently, during the process of performing gear shifting is performed, the virtual engine speed (OmegaVir) may be obtained as a value that results from applying a preset rate limit to the target input speed based on the virtual current gear-shift step.

According to the present disclosure, the current virtual engine speed (OmegaVir) that is to be reached during the process of performing gear shifting may be obtained from a real-time virtual vehicle speed, and may be determined as a value that changes within the preset rate limit (a value for limiting a change rate) ranging from a virtual speed based on a current gear-shift step (the target input speed based on the virtual current gear-shift step) to a virtual speed based on the target gear-shift step (the target input speed based on the virtual target gear-shift step).

In addition, subsequently, as the gear shifting progresses to some degree, the virtual engine speed (OmegaVir), which is set to be the target input speed (OmegaCur) based on the virtual current gear-shift step (=the virtual engine speed for the virtual current gear-shift step), is replaced with the target input speed (OmegaTar) based on the virtual target gear-shift step (=the virtual engine speed for the virtual target gear-shift step). As another method, the virtual engine speed (OmegaVir) may be calculated by employing a rate limit value for what is obtained by multiplying the virtual vehicle speed (SpdVir) that is the reference vehicle speed, by the virtual gear ratio (rGi) corresponding to the previously-calculated delay target gear-shift step.

On the other hand, in the virtual gear-shift model (M) within the virtual gear-shift controller 22, the virtual current gear-shift step (CurGe) fundamentally refers to a current gear-shift step at a previous time step, that is, a current gear-shift step that is at work before the gear shifting starts, until before a current gear-shift completion condition is satisfied. In other words, a value of the current gear-shift step may be maintained until before the gear-shift completion condition is satisfied. The virtual target gear-shift step determined by the gear-shift schedule map may be maintained as a target gear-shift step that is achieved after the gear shifting is completed.

However, when the gear-shift completion condition is satisfied after the gear shifting starts, the virtual current gear-shift step (CUrGe) that is at work before the satisfaction is substituted for the virtual target gear-shift step (TarGe). From a point in time at which the gear-shift completion condition is satisfied, the previous target gear-shift step becomes the current gear-shift step.

At this time, the gear-shift completion condition may include one or more of the following conditions:

1) the condition that a value of the virtual gear-shift progress ratio (xProgress) is 100%;
2) the condition that the value of the virtual gear-shift progress ratio (xProgress) is reset to 0%;
3) the condition that the value of the virtual gear-shift progress ratio (xProgress) is equal to or higher than a fixed value;
4) the condition that a difference between the virtual engine speed (OmegaVir) and the virtual engine speed (OmegaTar) for the virtual target gear-shift step (that is, the target input speed based on the virtual target gear-shift step) is equal or lower than the fixed value; and
5) the condition that a value obtained by multiplying the virtual vehicle speed (SpdVir) that is the reference vehicle speed, by the virtual gear ratio (rGi) corresponding to the delay target gear-shift step is the same as the virtual engine speed (OmegaVir) obtained by employing a rate limit value for the value obtained by the multiplication, or that a difference between the value obtained by the multiplication and the virtual engine speed (OmegaVir) is equal to or lower than a fixed value.

At this point, regarding the "condition that the value of the virtual gear-shift progress ratio (xProgress) is reset to 0%", in a case where a control logic is configured in such a manner that the virtual gear-shift progress ratio reaches 100% and then is immediately reset to 0%, it is determined, as described above, that a point in time at which the resetting to 0% is performed is a point in time at which the gear shifting is completed. In other words, the gear-shift progress ratio continues to be maintained at 0% until before a gear shift event starts again. However, it is possibly determined that a point in time itself at which the gear-shift progress ratio first reaches 0% is a point in time at which the gear shifting is completed.

As described above, the completion of the gear shifting may be determined based on the virtual gear-shift progress ratio (xProgress) and may be determined based on the virtual engine speed. When the virtual engine speed is converged to the virtual engine speed for the virtual target gear-shift step in such a manner that a value of a difference therebetween is equal to or less than a fixed value, it may also be determined that the gear-shift completion condition is satisfied.

Next, in a vehicle equipped with an actual transmission, each time gear upshifting is performed, a gear ratio may be reduced. Thus, a torque multiplication effect between front and rear steps in the transmission may be decreased. Accordingly, eventually, even if an engine generates the same torque, acceleration to be finally obtained decreases. In order to simulate this effect, according to the present disclosure, a limit torque (tqLmt) for each virtual gear-shift step may be calculated and used for limiting the torque command.

At this time, in the virtual gear-shift model (M) within the virtual gear-shift controller 22, the limit torque (tqLmt) for each virtual gear-shift step (a limit torque for the current gear-shift step) may be calculated by multiplying the virtual gear ratio (rGi) corresponding to the virtual current gear-shift step (CurGe), the virtual longitudinal deceleration gear ratio (rFg), and a limit torque setting parameter together. In addition, the limit torque (tqLmt) for each virtual gear-shift step is set in two directions, that is, driving and regenerating directions of the motor. This is realized by using two limit torque setting parameters.

In order to apply this limit torque and thus control the motor torque, the motor torque in the driving direction may be limited to a value of the limit torque (tqLmt) for the driving direction, and the motor torque in the regenerating direction is limited to a value of the limit torque (tqLmt) for the regenerating direction.

There is still another method. Three types of motor torque commands, regenerative, coasting, and driving motor torque commands, are generated, and are added up, thereby the basic torque command. Then, when driving, the torque command is limited to the value of the limit torque (tqLmt) for the driving direction. When coasting and when regenerating, the torque command is limited to the value of the limit torque (tqLmt) for the regeneration direction. Of course, when driving, a regenerative torque command and a coasting torque command may have a value of 0, and when regenerating or when coasting, a driving torque command may have a value of 0.

In addition, to not only limit a maximum magnitude of a torque, but also to simulate a gear ratio effect that is proportionally applied, when determining a numerical value between the acceleration pedal input value (APS value) and a driving torque, an application ratio of the acceleration pedal input value to the value of the limit torque (tqLmt) for the driving direction is used instead of an application ratio of the acceleration pedal input value (APS value) to a maximum motor torque.

Additionally, in addition to a method of determining the torque command using a simple acceleration pedal input value (APS value) ratio of the limit torque (tqLmt) for each virtual gear-shift step, the torque command may be determined using a torque ratio that is a function of a preset acceleration pedal input value of the limit torque (tqLmt). For example, when the acceleration pedal input values, that is, the APS values, are 20%, 50%, and 80%, respectively, torques for basic torque commands may be respectively determined as 20%, 50%, and 80% of the limit torque (tqLmt). However, when the APS values are 20%, 50%, and 80%, respectively, if torque ratio values that are respectively mapped to the APS values are 40%, 70%, and 85%, respectively, torques for basic torque commands may be respectively determined as 40%, 70%, and 85% of the limit torque (tqLmt).

Figure 5:
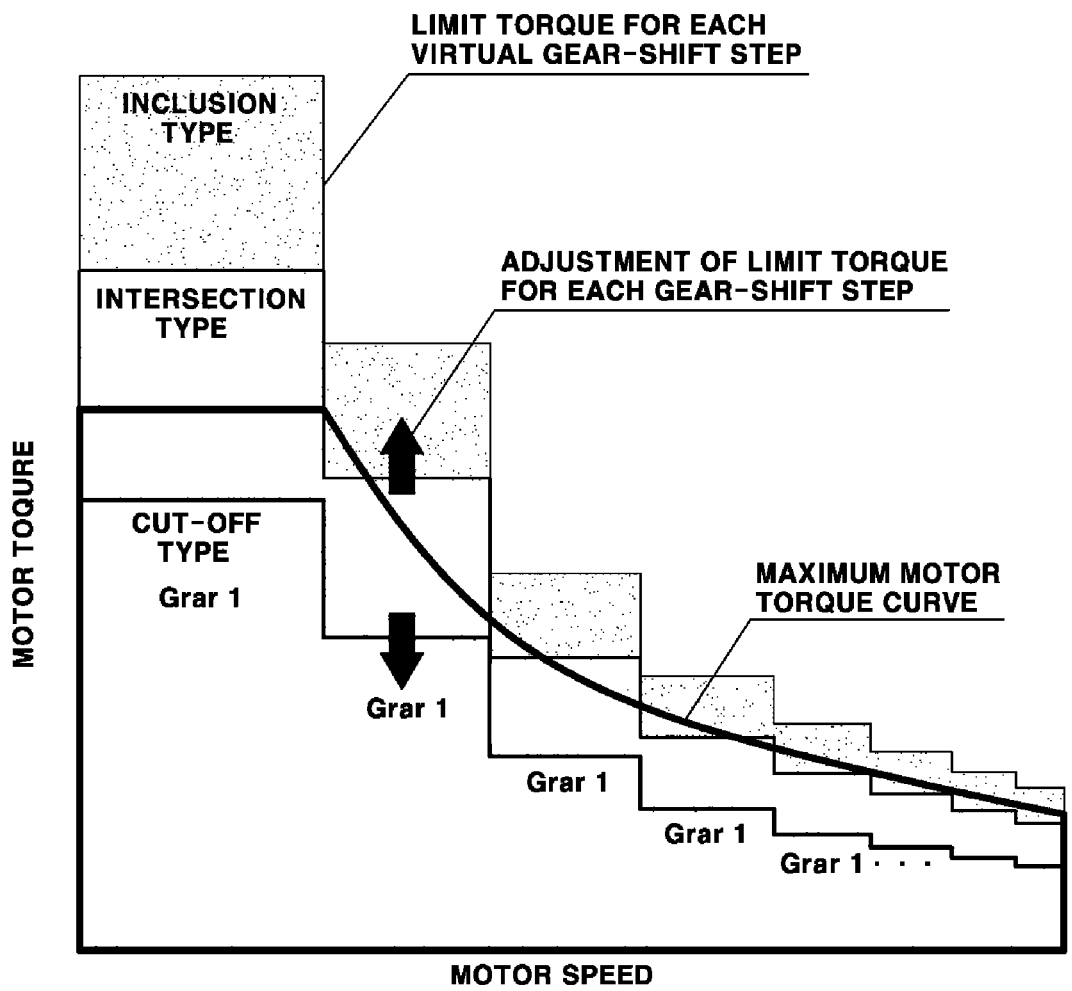
FIG. 5 is a graph illustrating a maximum motor torque curve as a function of a motor speed and a limit torque for each virtual gear-shift step according to the present disclosure.

FIG. 5 is a graph illustrating a maximum motor torque curve a motor speed as a function of a motor speed and a limit torque for each of the virtual gear-shift steps (gears 1, 2, 3, 4, 5 and so forth) according to the present disclosure. FIG. 5 shows that the higher the motor speed, the higher the gear-shift step (gear step) and that the higher the gear-shift step, the lower the maximum motor torque. In addition, FIG. 5 shows that the higher the gear-shift step, the lower the gear ratio and that a final wheel transfer torque is decreased in a high step than is the case in a low step. The maximum motor torque curve is a curve illustrating a preset maximum allowable torque for each motor speed. The limit torque for each virtual gear-shift step may be calculated, reflecting the gear ratio information for each gear-shift step.

FIG. 5 illustrates various examples in which the limit torque for each virtual gear-shift step is determined. As described above, the limit torque for each virtual gear-shift step (the limit torque for the current gear-shift step) may be calculated as a value obtained by multiplying the virtual gear ratio (rGi) corresponding to the virtual current gear-shift step (CurGe), the virtual longitudinal deceleration gear ratio (rFg), and the limit torque setting parameter together.

This means that a magnitude of the limit torque for each virtual gear-shift step may be set according to a limit torque setting parameter value. FIG. 5, shows that the limit torque for each virtual gear-shift step may be adjusted to have a value above or below the maximum motor torque curve. As an example of this, as illustrated in FIG. 5, the limit torque for each virtual gear-shift step may be set to have a greater value than a corresponding maximum motor torque on the maximum motor torque curve. In particular, it may be possible that maximum performance of the motor is achieved.

Alternatively, a graph line for the limit torques for virtual gear-shift steps may be plotted in such a manner as to intersect the maximum motor torque curve. A value of the limit torque for each virtual gear-shift step may beset to be greater in one or several sections of the motor speed than a corresponding value on the maximum motor torque curve, and a value of the limit torque therefor is set to be equal to or less than in the other sections thereof than a corresponding value on the maximum motor torque curve. Thus, it may be possible that the maximum performance of the motor is achieved in one or several sections of the motor speed for each virtual gear-shift step and it may also be possible that an effect of a difference in a gear ratio between steps is achieved in one or several sections thereof. In addition, it may be possible that a value of the limit torque for each virtual gear-shift step is set to be decreased in all sections of the motor speed than a corresponding value on the maximum motor torque curve. In particular, it is impossible that the maximum performance of the motor is achieved, but it is possible that the effect of the difference in the gear ratio between the steps is achieved to a maximum. On the other hand, the final torque command generation unit 23 of the first controller 20 may be configured to receive the basic torque command resulting from adding up the motor torque commands, from the torque command generation unit 21, and receive the virtual gear-shift intervention torque command from the virtual gear-shift controller 22.

In addition, the final torque command generation unit 23 may be configured to correct the basic torque command generated in the torque command generation unit 21 using the virtual gear-shift intervention torque command generated in the virtual gear-shift controller 22. At this time, the final torque command generation unit 23 may be configured to additionally add the virtual gear-shift intervention torque command that is the compensation torque command for generating the feeling of real gear shifting, to the basic torque command resulting from adding up the motor torque commands, thereby generating the final torque command.

Figure 6:
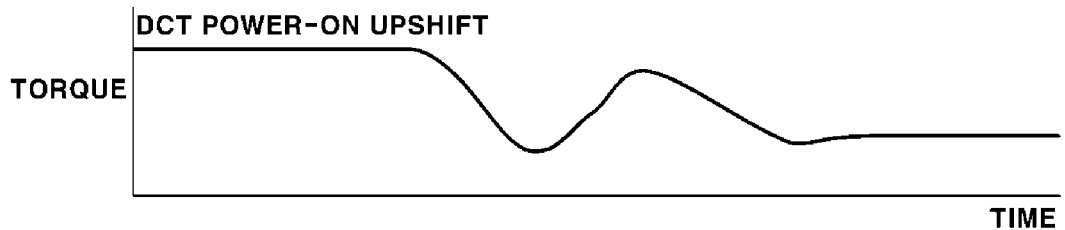
FIG. 6 is a graph illustrating an example of a virtual gear-shift intervention torque profile according to the present disclosure.

FIG. 6 is a graph illustrating an example of a virtual gear-shift intervention torque profile according to the present disclosure. Accordingly, the second controller 30 may be configured to receive the final torque command generated and output by the final torque command generation unit 23 of the first controller 20 and then operate an inverter according to the received final torque command, thereby operating the drive device 41. As a result, a vehicle jerk phenomenon that appears according to a gear-shift effect when performing virtual gear shifting is realized in a similar manner as when performing gear shifting in the actual transmission.

In the virtual gear-shift model (M) within the virtual gear-shift controller 22, the virtual gear-shift intervention torque (tqItv) is provided in the form of a torque profile in which the virtual gear-shift progress ratio (xProgress) is set to be an independent variable. Alternatively, the virtual gear-shift intervention torque (tqltv) may be provided by a physical-value reflection model based on the virtual engine speed (OmegaVir), the target input speed (OmegaCur) based on the virtual current gear-shift step (that is, the virtual engine speed for the virtual current gear-shift step), and the target input speed (OmegaTar) based on the virtual target gear-shift step (that is, the virtual engine speed for the virtual target gear-shift step).

In addition, in calculating the virtual gear-shift intervention torque command, the virtual gear-shift intervention torque should differ in shape according to a type of transmission and a gear-shift class. Types of transmissions include an automatic transmission (AT), a dual clutch transmission (DCT), an automated manual transmission (AMT), and the like. In addition, gear-shift classes include power-on upshift, power-off upshift (lift-foot-up), power-on downshift (kick-down), power-off downshift, and near-stop downshift.

To calculate the virtual gear-shift intervention torque command, the virtual gear-shift controller 22 may be configured to determine a current gear-shift class. In this determination method, when the virtual target gear-shift step (TarGe) is higher than the virtual current gear-shift step (CurGe) (that is, the virtual target gear-shift step>the virtual current gear-shift step), this is the case for upshift. Conversely, when the virtual target gear-shift step (TarGe) is lower than the virtual current gear-shift step (CurGe) (that is, the virtual target gear-shift step>the virtual current gear-shift step), this is the case for downshift.

In addition, when the basic torque command is greater than a preset reference torque value, this is the case for power-on. Conversely, when the basic torque command is greater than the preset reference torque value, this is the case for power-off. As a result, according to the present disclosure, when the current gear-shift class is determined based on the virtual current gear-shift step, the virtual target gear-shift step, and the like, a virtual gear-shift intervention torque profile corresponding to the current gear-shift class is selected from among the virtual gear-shift intervention torque profiles for gear-shift classes. The virtual gear-shift intervention torque for generating the feeling of real gear shifting may be determined in real time according to the selected virtual gear-shift intervention torque profile.

At this time, a value of the virtual gear-shift intervention torque, corresponding to a current virtual gear-shift progress ratio, may be determined from the selected virtual gear-shift intervention torque profile. The virtual gear-shift intervention torque profile is information that, for each gear-shift class, is preset to be added to the virtual gear-shift model (M) within the virtual gear-shift controller 22. The virtual gear-shift intervention torque profile that varies according to a type of transmission, as well as the gear-shift class, may be preset.

A magnitude of the virtual gear-shift intervention torque may beset to be adjusted using as torque magnitude setting variables the virtual engine speed (OmegaVir), the acceleration pedal input value (APS value), an actual motor torque (that is, the basic torque command to the motor, which is generated in the torque command generation unit 23), and one of the virtual current gear-shift step (CurGe) and the virtual target gear-shift step (TarGe), or one or more combinations of these two.

Generally, it is natural that the greater the magnitude of the motor torque (that is, the basic torque command), the greater the magnitude of the virtual gear-shift intervention torque should be, that because the higher the gear-shift step, the lower the ratio between steps, the magnitude of the virtual gear-shift intervention torque should be decreased, and that because the higher the virtual engine speed, the higher the degree to which the speed is decreased and increased when performing gear shifting, the magnitude of the virtual gear-shift intervention torque should also be increased. On the other hand, as described above, according to the present disclosure, the boost is defined as instantaneously generating a motor torque greater than the maximum allowable torque that is determined using the normal state as a reference.

According to the present disclosure, the final motor torque command determined in the final torque command generation unit 23 of the first controller 20 may be changed to a value greater than that of the maximum allowable torque for a short time, that is, instantaneously and temporarily, and then may be restored to an original state. In this manner, the motor boost is realized.

The method of controlling traveling of an electric vehicle according to the present disclosure may include: generating a motor torque command using a basic torque command and a virtual gear-shift intervention torque for generating a feeling of real gear shifting, while an electric vehicle is being driven; and operating a motor for driving the electric vehicle, according to the generated motor torque command and thus generating the feeling of real gear shifting, in which in the generating of the feeling of real gear shifting, boost control controlling the operation of the motor is performed, during at least a portion of time during which the feeling of real gear shifting is generated, in such a manner that a motor torque exceeding an allowable torque of the motor is generated, and thus the generation of the feeling of real gear shifting and the boost control are performed in conjunction with each other.

At this point, the at least the portion of the time during which the feeling of real gear shifting is generated may be a section during which an inertia phase in a virtual gear-shift process is simulated. According to the present disclosure, methods of realizing instantaneous boost in conjunction with the generation of the feeling of virtual gear sift are broadly divided into two methods.

Figure 7:
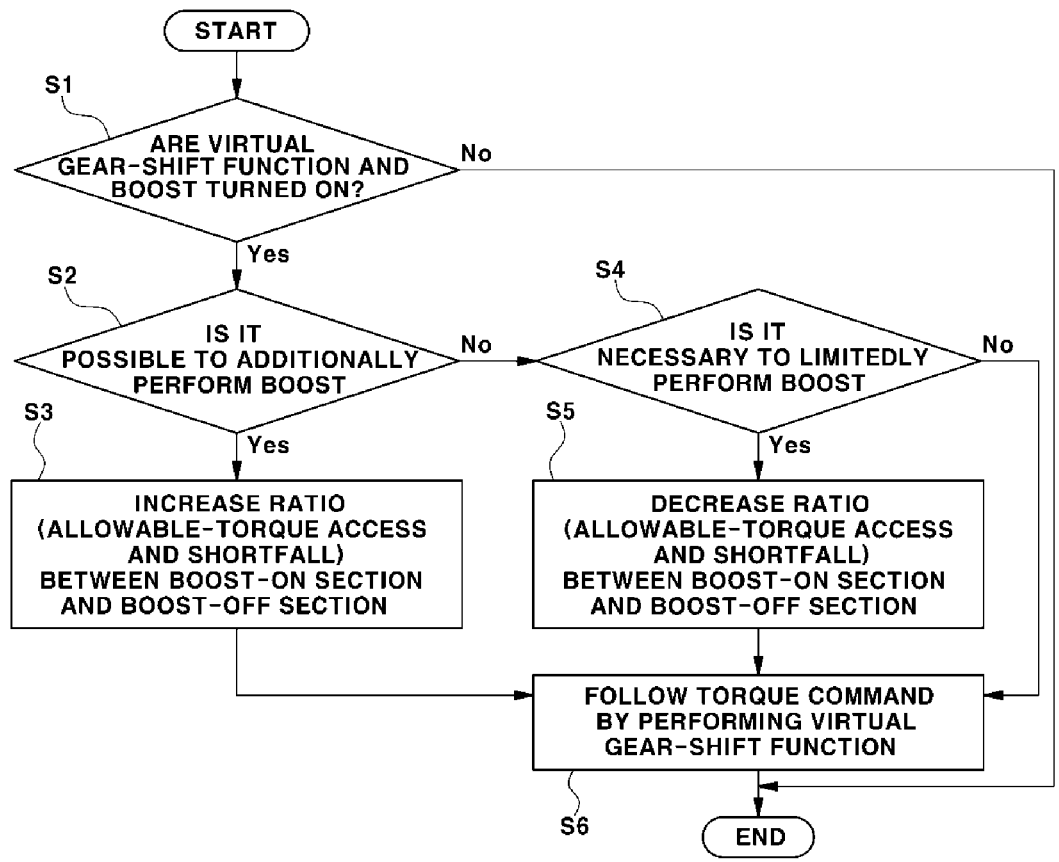
FIG. 7 is a flowchart illustrating a method of realizing boost in conjunction with a feeling of real gear shifting according to the present disclosure.

1) to realize an excess by which a maximum output torque for the virtual gear-shift step is exceeded 2) to realize a torque-phase feature of the virtual gear-shift intervention torque and realize a push-feel or a drag-feel in the inertial phase while accelerating FIG. 7 is a flowchart illustrating a method of realizing the boost in conjunction with the feeling of real gear shifting according to the present disclosure. First, the realization of the excess by which the maximum output torque for the virtual gear-shift step is exceeded will be described. In the vehicle equipped with the actual transmission, the uplifting from a low step to a high step decreases the gear ratio. Thus, the torque multiplication effect between the front step and the rear step in the transmission is decreased. For this reason, even if an engine generates the same torque, acceleration to be finally obtained is decreased. The torque multiplication effect should be simulated when realizing the virtual gear-shift function. To realize the virtual gear-shift function, the limit torque for each virtual gear-shift step is calculated and used.

As described above with reference to FIG. 5, the limit torque for each virtual gear-shift step is employed by performing an "inclusion type" technique, an "intersection type" technique, or a "cut-off type" technique. In the "inclusion type" technique, the limit torque for each virtual gear-shift step is employed that is higher than a corresponding limit torque on the maximum motor torque curve. In the "intersection type" technique, the limit torque for each virtual gear-shift step is employed that is equal to a corresponding limit torque on the maximum motor torque curve. In the "cut-off type" technique, the limit torque for each virtual gear-shift step is employed that is lower than a corresponding limit torque on the maximum motor torque curve.

The maximum motor torque curve here is a curve showing a maximum allowable torque that is preset for each motor speed using the normal state as a reference, and is a maximum torque curve that results when the boot is not performed. According to the present disclosure, to perform effective boost using the virtual gear-shift step, it is preferable that the limit torque for each virtual gear-shift step is set to be a torque on the maximum motor torque curve.

In other words, according to the present disclosure, to perform the boost control, among the above-described techniques of calculating the limit torque for each virtual gear-shift step, it may be possible to apply the "intersection type" technique in which the graph line for the limit torque for each virtual gear-shift step is plotted in such a manner as to intersect the maximum motor torque curve. In the intersection type technique, a value of the limit torque for each virtual gear-shift step is set to be higher in one or several sections of the motor speed than a corresponding value on the maximum motor torque curve, and a value of the limit torque therefor is set to be equal to or lower in the other sections thereof than a corresponding value on the maximum motor torque curve.

Figure 8:
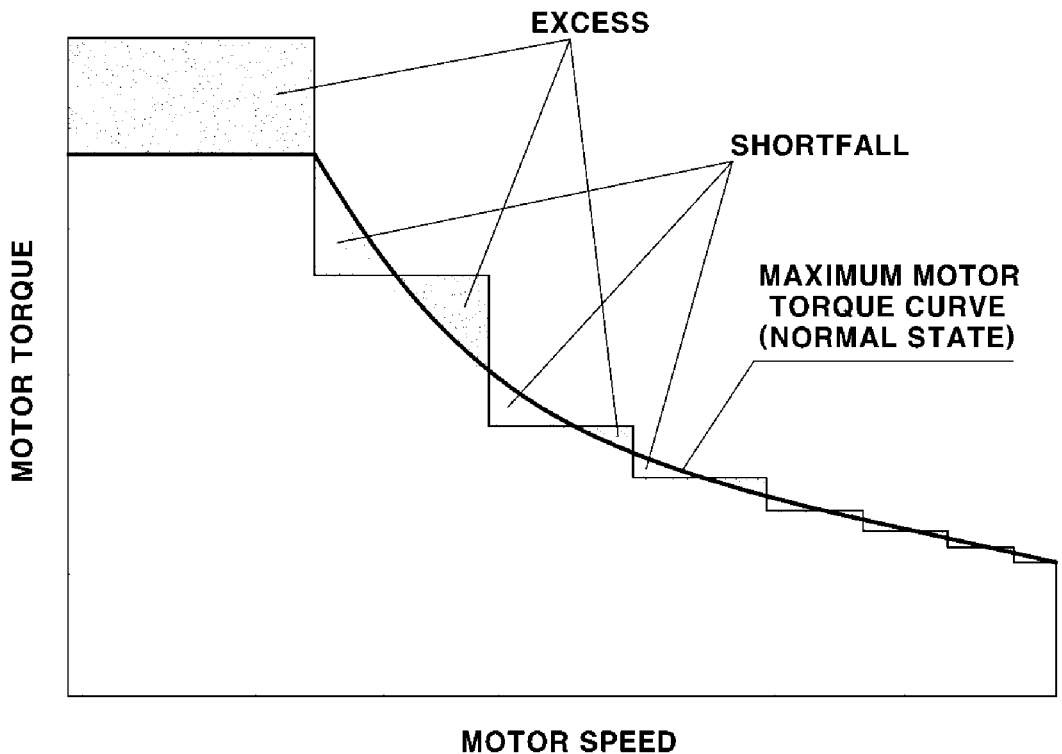
FIG. 8 is a graph illustrating an excess and a shortfall in the limit torque for each virtual gear-shift step by comparison with the maximum motor torque curve according to an exemplary embodiment of the present disclosure.

FIG. 8 is a graph illustrating an excess and a shortfall in the limit torque for each virtual gear-shift step by comparison with the maximum motor torque curve as a function of the motor speed when applying the "intersection type" technique according to an exemplary embodiment of the present disclosure. As illustrated, for control, a torque excess section in which the limit torque for each virtual gear-shift step exceeds a maximum motor torque corresponding to a current motor speed is set to be a section in which the boost is performed. Furthermore, for control, a torque shortage section in which the limit torque for each virtual gear-shift step is lower than the maximum motor torque corresponding to the current motor speed is set to be a section in which the boost is not performed and in which a load is adjusted. Thus, the boost is turned on and off in conjunction with the feeling of real gear shifting.

At this time, a ratio between a torque excess in an excess section in which the boost is performed and a torque shortfall in a shortfall section in which the boost is not performed is adjusted according to specifications for the motor. It may be determined whether the limit torque for each virtual gear-shift step, described above, is set, on the basis of the "intersection type" technique, in a similar manner as when applying the "inclusion type" technique or in a similar manner as when applying the "cut-off type" type technique. This may apply not only to a torque in an accelerating direction (motor discharging and driving directions), but also to a torque in a decelerating direction (motor charging and regenerating directions) on the same principle.

Additionally, the limit torque for each virtual gear-shift step may be adjusted according to a state of a PE component, that is, a current temperature of the PE component, such as the motor, a temperature of coolant, or the like, and thus a ratio between the torque excess and the torque shortfall is adjusted. For example, the "intersection type" technique is fundamentally applied to set the magnitude of the limit torque for each virtual gear-shift step as a function of the motor speed, in such a manner that the torque excess and the torque shortfall are caused to occur alternately in a reiterative manner. However, when due to a high temperature, the boost is limitedly performed, the magnitude of the limit torque may beset relatively in a similar manner as when performing the "cut-off type" technique. Conversely, when a temperature is low and cooling is easy to perform, the magnitude of the limit torque is set in a similar manner as when performing the "inclusion type" technique.

As described above, the limit torque (tqLmt) for each virtual gear-shift step may be calculated by multiplying the virtual gear ratio (rGi) corresponding to the virtual current gear-shift step (CurGe), the virtual longitudinal deceleration gear ratio (rFg), and the limit torque setting parameter together. Adjustment of the limit torque setting parameter makes it possible to adjust the limit torque for each virtual gear-shift step, as described above. Next, the realization of a torque-phase feature of the virtual gear-shift intervention torque and the realization of the push-feel or drag-feel in the inertia phase while accelerating will be described.

Figure 9:
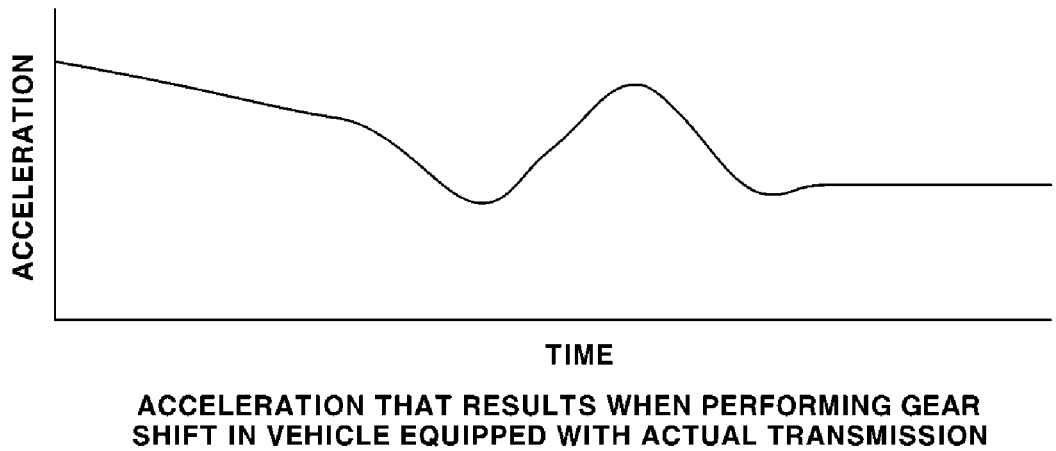
FIG. 9 is a reference graph illustrating a change in vehicle acceleration over time when performing gear shifting in a vehicle equipped with an actual transmission.
Figure 10:
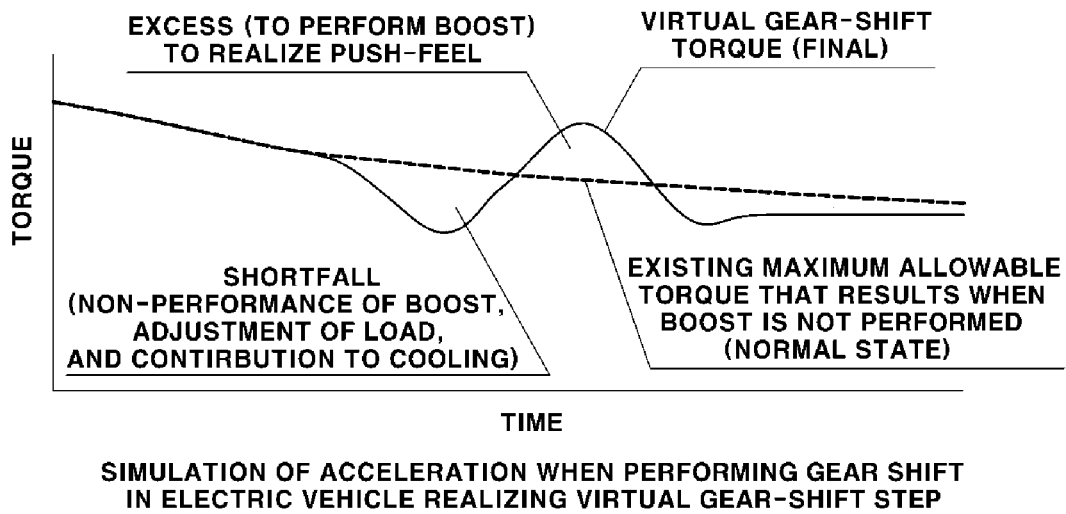
FIG. 10 is a graph illustrating a state of a virtual gear-shift intervention torque that is applied while accelerating, which is used in order to realize the feeling of real gear shifting according to the present disclosure.

FIG. 9 is a reference graph illustrating a change in the vehicle acceleration over time when performing gear shifting in the vehicle equipped with the actual transmission. FIG. 10 is a graph illustrating a state of the virtual gear-shift intervention torque that is applied while accelerating, which is used to realize the feeling of real gear shifting, that is, to simulate the change in the vehicle acceleration as illustrated in FIG. 9, when accelerating, according to the present disclosure. In the vehicle equipped with the actual transmission, due to interaction of frictional elements and a change in an input torque of the transmission when performing gear shifting, an output torque of the transmission changes. This change takes place over the torque phase and the inertia phase while performing gear shifting.

In addition, in the inertia phase, when performing gear shifting, there occurs a case where due to a speed change in inertia of a front step in the transmission, an additional acceleration/deceleration torque other than an input torque is applied toward a rear step in the transmission. When performing upshifting in the vehicle equipped with the actual transmission, if the inertia of the front step in the transmission decelerates, a torque in an accelerating direction is applied toward an output shaft. This application is referred to as the push-feel. Conversely, when performing downshifting, if the inertia of the front step in the transmission accelerates, a torque in a decelerating direction is applied toward the output shaft. This application is referred to as the drag-feel.

FIG. 10 illustrates an example of boost-on/off control for simulating the vehicle acceleration when performing gear shifting according to the present disclosure, in an electric vehicle in which the feeling of real gear shifting is realized, and illustrates an example in which the boost for the torque excess is performed to generate the push-feel. In FIG. 10, a dotted line indicates the maximum allowable torque that results when the boost that is determined using the normal state as a reference is not performed. The torque excess refers to a magnitude of the torque by which the motor torque indicated by a solid line exceeds the corresponding maximum allowable torque indicated by the dotted line.

In addition, the torque shortfall refers to a magnitude of the torque by which the motor torque indicated by the solid line falls short of the corresponding maximum allowable torque by the dotted line. The solid line in FIG. 10 indicates the motor torque for simulating acceleration when performing gear shifting in the electric vehicle equipped with the transmission as illustrated in FIG. 9, according to the present disclosure. The motor torque indicated by the solid line is the virtual gear-shift intervention torque (compensation torque) for realizing the feeling of real gear shifting.

In addition, a torque indicated by the solid line in FIG. 10 may be the torque command and, according to the present disclosure, is the virtual gear-shift intervention torque command for performing the boost in conjunction with the feeling of real gear shifting. Specifically, the torque indicated by the solid line in FIG. 10 is a torque command that is output by the virtual gear-shift controller 22 of the first controller 20 among constituent elements in FIG. 1. According to the present disclosure, when the second controller 30 operates the motor according to the final torque command generated in the first controller 20, a state of the vehicle acceleration, as illustrated in FIG. 9, is stimulated.

According to the present disclosure, a change in the torque, as described above, may also be simulated when realizing the feeling of real gear shifting. Thus, a method of turning on and off the boost in conjunction with the change in the torque is proposed. With this method, a strategy of performing the boost may be applied bi-directionally in directions of exceeding maximum allowable discharging and charging torques in order to simulate the feeling of real gear shifting.

FIG. 10, shows that a boost non-performance section (boost-off section) in which the motor torque is decreased to below an existing maximum allowable torque that is determined using the normal state as a reference, and a boot performance section (boost-on section) in which the motor torque is increased to above the existing maximum allowable torque are reiterated alternately. In FIG. 10, the torque shortfall in the boost non-performance section is the magnitude of the torque by which the motor torque (the torque command) falls short of the maximum allowable torque when generating the feeling of real gear shifting. Thus, there is as much room for the motor torque command as the torque shortfall in the virtual gear-shift process. The motor torque command here has a lower value than the maximum allowable torque. This contributes to cooling the PE component, such as the motor.

On the other hand, the torque excess in the boost performance section is the magnitude of the torque by which the motor torque (the torque command) exceeds the maximum allowable torque. The motor torque command is generated such that the maximum allowable torque is exceeded temporarily while the feeling of real gear shifting is generated in the virtual gear-shift process. The motor torque may thus be output that exceeds the maximum allowable torque in the process of realizing the feeling of virtual gear shifting. Thus, the push-feel may be realized at the same time that the motor boost is performed.

Figure 11:
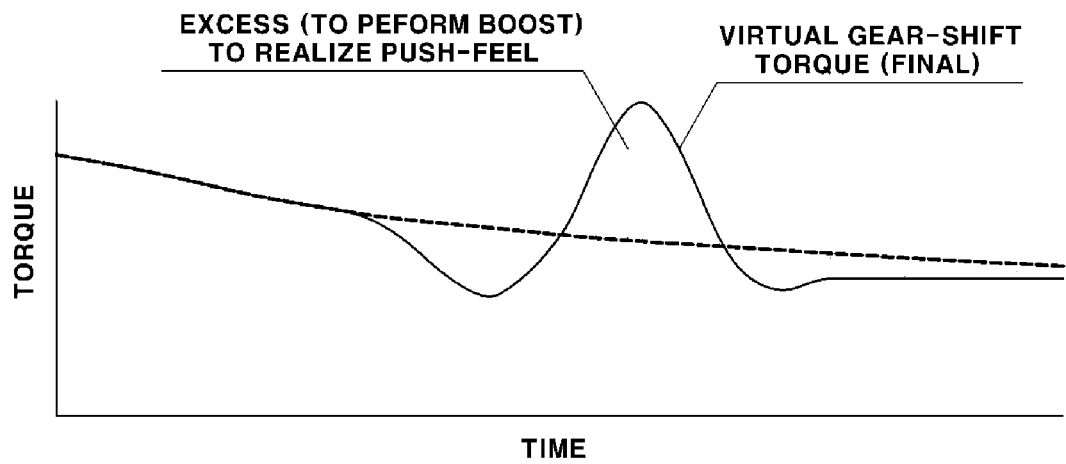
FIGS. 11 and 12 are graphs each illustrating an example where a magnitude of a push-feel is adjusted when generating the feeling of real gear shifting according to the present disclosure.
Figure 12:
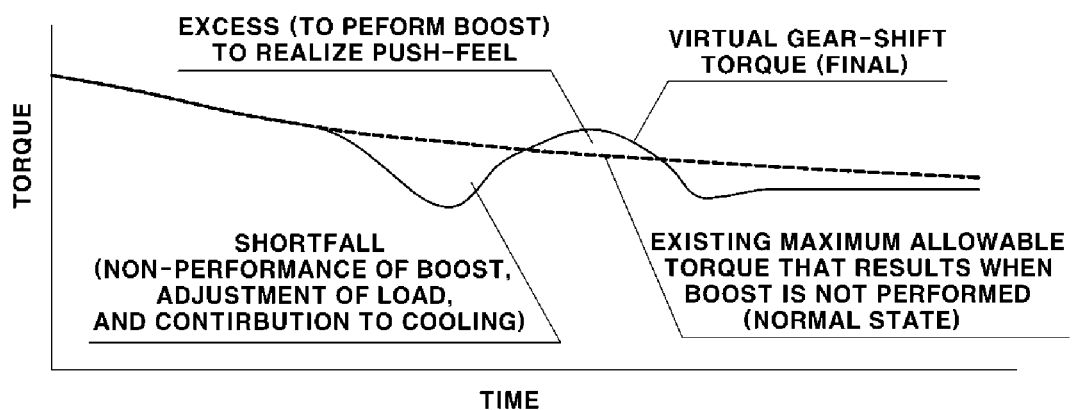

FIGS. 11 and 12 are graphs each illustrating an example where a magnitude of the push-feel is adjusted when generating the feeling of real gear shifting according to the present disclosure. FIGS. 11 and 12 each illustrate a motor torque curve (a curve for the virtual gear-shift intervention torque command) showing the virtual gear-shift intervention torque when performing upshifting. In FIGS. 11 and 12, a maximum allowable torque curve is a maximum allowable discharging torque curve.

When performing downshifting, a motor torque curve (e.g., the curve for the virtual gear-shift intervention torque command) that results from turning upside down the illustrated motor torque curve resulting when performing upshifting is obtained. At this time, the maximum allowable torque curve becomes a maximum allowable charging torque curve. When performing downshifting, regarding the virtual gear-shift intervention torque, the drag-feel may be realized with the torque excess by which the maximum allowable charging torque is exceeded.

In other words, when performing upshifting, the push-feel in the inertia phase may be realized with the torque excess by which the maximum allowable discharging torque is exceeded. However, when performing downshifting, the drag-feel in the inertia phase may be realized with the torque excess (e.g., an excess by which an absolute value of the charging torque is exceeded) by which the maximum allowable charging torque is exceeded.

Additionally, according to the present disclosure, a profile of the virtual gear-shift intervention torque may be adjusted according to an operating state of the PE component, that is, a current temperature of the PE component, such as the motor, a temperature of a coolant for cooling the PE component, such as the motor, or the like. Thus, the ratio between the torque excess and the torque shortfall may be adjusted. For example, when a temperature is low and cooling is easy to perform, as illustrated in an example in FIG. 11, a magnitude of the push-feel or the drag-feel may beset to be increased. Furthermore, when due to a high temperature, the boost is limitedly performed, as illustrated in an example in FIG. 12, the magnitude of the push-feel or the drag-feel is set to be decreased. In addition, a ratio between a limit toque excess and a limit torque shortfall is adjusted with methods of adjusting a duration (maintenance time of the torque excess) for the push-feel or the drag-feel, adjusting an offset of the overall virtual gear-shift intervention torque profile, and so forth, in addition to the method of adjusting the magnitude of the push-feel or the drag-feel.

With reference to FIG. 7, when turning on the virtual gear-shift function, a motor boost function may also be turned on. When the virtual gear-shift function is turned on and the boost is turned on, the controller may be configured to determine whether to additionally perform the boost, or whether limit the boost performance. In addition, when it is possible that the boost is additionally performed, a boost-on section and the torque excess are increased, as illustrated in FIG. 11. Furthermore, when the boost is limited, the boost-on section and the torque excess are relatively decreased, as illustrated in FIG. 12.

The embodiment of the present disclosure is described in detail above, but this imposes no limitation on the claimed scope of the present disclosure. Various modifications and improvements that a person of ordinary skill in the art makes using the basic concept of the present disclosure that is defined in the following claims are also included in the claimed scope of the present disclosure.

What is claimed is:

1. A method of controlling traveling of an electric vehicle, comprising:

generating, by a controller, a motor torque command using a basic torque command and a virtual gear-shift intervention torque for generating a feeling of real gear shifting, while an electric vehicle travels; and operating, by the controller, a motor for driving the electric vehicle, according to the generated motor torque command and generating the feeling of real gear shifting, wherein in the generating of the feeling of real gear shifting, during at least a portion of time during which the feeling of real gear shifting is generated, a boost control of controlling the motor operation is performed such that a motor torque exceeding an allowable torque of the motor is generated, and the generation of the feeling of real gear shifting and the boost control are performed in conjunction with each other.

2. The method according to claim 1, wherein the at least the portion of the time during which the feeling of real gear shifting is generated is a section during which an inertia phase in a virtual gear-shift process is simulated.

3. The method according to claim 1, wherein in the generating of the feeling of real gear shifting, when performing virtual upshifting, the motor is operated with the motor torque command that is generated using the virtual gear-shift intervention torque greater than a maximum allowable discharging torque of the motor, and a push-feel in the electric vehicle is realized.

4. The method according to claim 1, wherein in the generating of the feeling of real gear shifting, when performing virtual downshifting, the motor is operated with the motor torque command generated using the virtual gear-shift intervention torque greater than a maximum allowable charging torque of the motor, and a drag-feel in the electric vehicle is realized.

5. The method according to claim 1, wherein in the generating of the feeling of real gear shifting, the controller is configured to:
perform boost-on control that uses the virtual gear-shift intervention torque higher than a maximum allowable torque of the motor, and boost-off control that uses the virtual gear-shift intervention torque lower than the maximum allowable torque of the motor, using the virtual gear-shift intervention torque lower than the maximum allowable torque of the motor, during remaining portions other than the at least portion of the time during which the feeling of real gear shifting is generated.

6. The method according to claim 5, wherein in the generating of the feeling of real gear shifting, the controller is configured to adjust a ratio between a torque excess by which the virtual gear-shift intervention torque exceeds the maximum allowable torque of the motor and a torque shortfall by which the virtual gear-shift intervention torque falls short of the maximum allowable torque of the motor, according to an operating state of a powertrain electronic (PE) component.

7. The method according to claim 6, wherein the operating state of the powertrain electronic (PE) component is specified by a temperature of the motor or a temperature of a coolant cooling the motor.

8. The method according to claim 5, wherein in the generating of the feeling of real gear shifting, the controller is configured to adjust a magnitude of a torque excess by which the virtual gear-shift intervention torque exceeds the maximum allowable torque, or maintenance time of the torque excess, according to an operating state of a powertrain electronic (PE) component.

9. The method according to claim 8, wherein the operating state of the powertrain electronic (PE) component is specified by a temperature of the motor or a temperature of a coolant cooling the motor.

10. The method according to claim 1, wherein, the boost control includes operating the motor using the motor torque command generated by the basic torque command limited to the limit torque having a value higher than a torque value on a maximum motor torque curve, the limit torque being set to limit the basic torque command.

11. The method according to claim 10, wherein a value of the limit torque for each virtual gear-shift step is set to be higher in a partial range of motor speeds than a corresponding value on the maximum motor torque curve, and a value of the limit torque for each virtual gear-shift is set to be equal to or lower in the remaining range of the motor speeds other than the partial range of the motor speeds than a corresponding value on the maximum motor torque curve.

12. A method of controlling traveling of an electric vehicle, comprising:
generating, by a controller, a motor torque command using a basic torque command and a virtual gear-shift intervention torque for generating a feeling of real gear shifting, while an electric vehicle travels; and
operating, by the controller, a motor for driving the electric vehicle, according to the generated motor torque command and generating the feeling of real gear shifting,
wherein in the generating of the feeling of real gear shifting, during at least a portion of time during which the feeling of real gear shifting is generated, a boost control of controlling the motor operation is performed to generate a motor torque exceeding an allowable torque of the motor such that the generation of the feeling of real gear shifting and the boost control are performed in conjunction with each other,
wherein a torque excess section in which a limit torque for each virtual gear-shift step exceeds a maximum motor torque corresponding to a current motor speed is set to be a section in which the boost is performed and a torque shortage section in which the limit torque for each virtual gear-shift step is lower than the maximum motor torque corresponding to the current motor speed is set to be a section in which the boost is not performed such that the boost control is turned on and off in conjunction with the feeling of real gear shifting.

13. A method of controlling traveling of an electric vehicle, comprising:
generating, by a controller, a motor torque command using a basic torque command and a virtual gear-shift intervention torque for generating a feeling of real gear shifting, while an electric vehicle travels; and
operating, by the controller, a motor for driving the electric vehicle, according to the generated motor torque command and generating the feeling of real gear shifting,
performing a boost control of controlling the motor operation such that a motor torque exceeding an allowable torque of the motor is generated, and the generation of the feeling of real gear shifting and the boost control are performed in conjunction with each other, in the generating of the feeling of real gear shifting, during at least a portion of time during which the feeling of real gear shifting is generated.

* * * * *